Sept. 6, 1932. W. H. KUSHERA ET AL 1,876,062
GLUE APPLICATOR
Filed Aug. 23, 1929
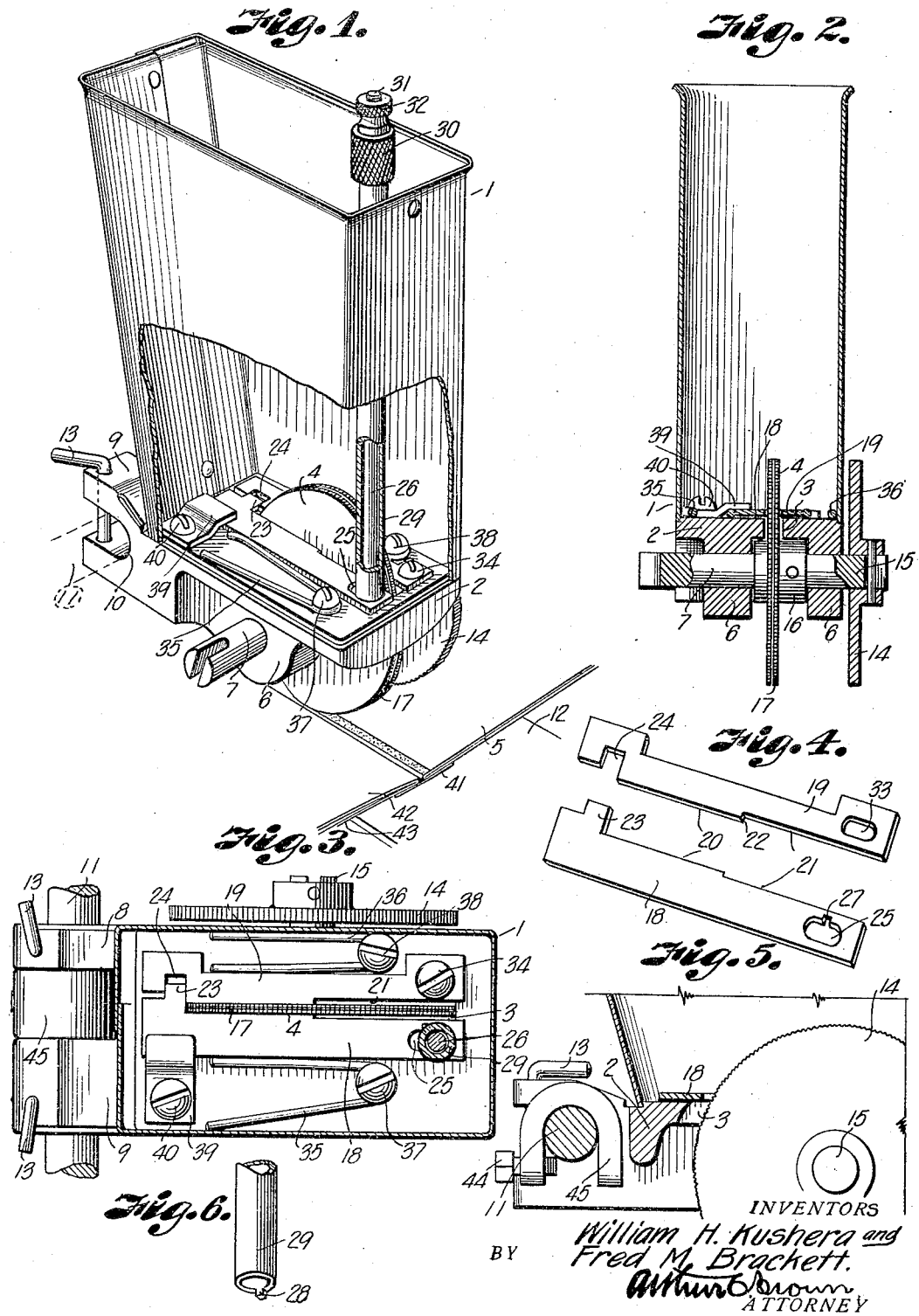
INVENTORS
William H. Kushera and
Fred M. Brackett.
BY Arthur C. Brown
ATTORNEY Patented Sept. 6, 1932

1,876,062

UNITED STATES PATENT OFFICE

WILLIAM H. KUSHERA AND FRED M. BRACKETT, OF TOPEKA, KANSAS, ASSIGNORS TO THE BRACKETT STRIPPING MACHINE CO., OF TOPEKA, KANSAS, A COPARTNERSHIP CONSISTING OF EDWARD M. BRACKETT AND FRED M. BRACKETT

GLUE APPLICATOR

Application filed August 23, 1929. Serial No. 387,949.

Our invention relates to glue applicators and like devices including pots having slots for movement of materials from the pots, and has for its principal objects to facilitate adjustment of the effective area of a slot for controlling the rate of delivery of material from a pot.

Glue applicators adapted for applying a strip of adhesive liquid to a sheet usually comprise a glue pot having a bottom slot and a glue roller operating in the slot for picking up glue and transferring the same to the sheet. It is sometimes desirable to change the effective area of the slot to permit the periphery of the roller to transfer a greater or less amount of glue upon each revolution. The slot-adjusting means is located in the bottom of the pot, and is accessible therefore only through the pot and easily accessible only when the pot is empty.

Further objects of our invention therefore are to provide easily accessible means for adjusting the effective area of a glue pot slot, to locate an operating member of the adjusting means exteriorly to the pot, and to enable an operator to adjust the slot area while a glue strip is being applied.

In accomplishing these and other objects of the invention, we have provided improved details of structure, the preferred forms of which are illustrated in the accompanying drawing, wherein:

Fig. 1 is a perspective view of a glue applicator embodying our invention located in functioning relation with a belt and sheets shown fragmentarily, parts of the pot wall and tubular adjusting shaft being broken away to better illustrate construction.

Fig. 2 is a vertical section of the applicator.

Fig. 3 is a plan view showing the pot walls and operating shaft and its anchor post in section.

Fig. 4 is a detail perspective view of slot-adjusting plates shown in spaced relation.

Fig. 5 is a vertical section of the rear portion of the applicator from front to back.

Fig. 6 is a perspective view of the lower end of the tubular shaft adapted to adjust the slot-adjusting plates.

Referring in detail to the drawing:

1 designates a glue pot having a bottom 2 provided with a longitudinal slot 3 in which a glue roller 4 operates to transfer an adhesive substance to a sheet 5.

The bottom 2 may comprise a relatively heavy body having spaced depending ears 6 provided with bearing apertures to receive a shaft 7 on which the roller is mounted, and rearwardly protruding brackets 8 and 9 for mounting the pot on a support.

The brackets have arcuate sockets 10 to receive a cylindrical bar 11, whereby the pot may be pivotally suspended from the bar, and may rest on the sheet that is being moved beneath the pot on a belt 12. The pot is retained on the bar by pins 13 inserted in the branches of the brackets forming the sockets.

The pot is preferably partly supported by a traction or drive wheel 14 fixed on an end 15 of the shaft 7 projecting laterally from the bottom and having a serrated periphery whereby engagement of the wheel with the moving sheet will effect rotation of the glue roller.

The glue roller has a hub 16 keyed to the shaft 7 and spacing the roller from the bearing ears for maintaining the roller in alignment with the slot. The periphery of the roller comprises a disk having a serrated periphery 17 forming teeth for engaging glue in the pot and transferring the same to the sheet. The roller rotates forwardly downwardly with reference to the front end of the pot.

Slidably mounted on the bottom of the pot are longitudinally extending strips or plates 18 and 19 positioned parallel with the slot and having front inner edge portions 20 spaced to engage the opposite sides of the roller for scraping glue from the sides and preventing glue from passing through the portions of the slot alongside the roller and in front of the axis of the roller.

The rear portions of the plates are incut to form longitudinal recesses 21 extending to the rear ends of the plates for permitting the roller to move freely through the rear portion of the slot and carry back into the pot any glue that may adhere to its sides.

The slot is longer than the diameter of the roller 4 and substantially wider than the thickness of the roller, and may have uniform width throughout its length. The longitudinal inner edges of the recessed portions of the plate normally register with the slot edges while the portions 20 of the plates overlie the slot to limit the effective width thereof in the area through which the roller operates downwardly and outwardly from the pot.

The effective delivery area of the slot comprises the space between the position of the periphery of the roller and the transverse edge 22 forming the front end of the slot. In order to effect adjustment of said slot area, we provide a wing or ear 23 adjacent the front end of the plate 18 extending transversely across the front end of the bottom and adapted to be moved longitudinally over said slot area toward and away from the periphery of the roller.

The wing 23 preferably extends in a notch 24 in the plate 19, thus providing interlocking engagement of the plates for causing coincidental movement thereof.

One of the plates, preferably the plate 18, is provided with an opening 25 elongated longitudinally thereof to admit a post 26 to the pot bottom, and with a notch 27 at one side of the opening to receive a lug 28 on a tubular shaft 29 shorter than the post and revolubly mounted thereon. A knurled annular boss 30 at the end of the shaft forms an operating handle and is located exteriorly to the pot.

The post is fixed in the pot bottom, and has a threaded upper end 31 projecting above the upper edge of the pot to receive a nut 32 adapted to engage the upper end of the shaft. The nut may be moved against the shaft to press the lower end of the shaft against the plate 18 and clamp or frictionally lock the plate to the pot bottom.

The rear end of the plate 19 is provided with a similar elongated opening or slot 33 and a pin 34 is fixed in the bottom in said slot for retaining the plate in a rectilinear path when moved by the other plate.

Springs 35 and 36 having branches bearing oppositely against the side walls of the pot and the plates are adapted to retain the front portions 20 of the plate in yielding contact with the roller. Headed screws 37 and 38 are fixed in the bottom to engage the looped ends of the springs and retain the springs in plate-pressing position.

A clip 39 having one end secured to the pot bottom by a screw 40 overlies the plate 18 at the front end thereof to retain the plate slidably in engagement with the bottom and thus further control the movement of glue through the bottom slot.

The form of applicator above described is especially adapted for use in a stripping machine including a shaft on which the glue pot may be slidably mounted for lateral adjustment across the path of the belt shown for tipping a signature. The sheet 5 shown in the drawing represents the front page of a signature attached to a binding strip 41 to which a folded piece of paper comprising an end sheet 42 and a waste sheet 43 is also attached.

The drive wheel 14 rides on the signature, and the pot is adjusted on the shaft to locate the glue roller at the inner edge of the signature. A set screw 44 threaded in a yoke 45 mounted on the shaft 11 is adapted to retain the applicator in adjusted position.

The drive wheel is rotated in anti-clockwise direction by frictional engagement with the signature, and thus rotates the glue roller for transferring glue from the pot for applying a stripe of glue to the edge of the signature.

The character of the stripe depends largely upon the effective area of the opening between the periphery of the roller and the end of the slot, and the viscosity of the glue. The width and length of the opening are determined by the plates 18 and 19.

The front side edge portions of the plates frictionally engaging the sides of the wheel prevent the moving roller from dragging glue from the pot, and limit the width of the stripe substantially to the width of the periphery of the roller. The plates are adjusted by rotation of the tubular shaft for locating the edge of the wing 23 in desired spaced relation with the path of the roller periphery to provide an opening having suitable length.

The serrated periphery of the roller controls flow of glue through the opening and carries glue in suitable amounts for deposit on the signature.

The rear edge portions of the plates are spaced to facilitate return to the pot of glue carried by the roller which moving upwardly between the rear portions of the plates prevents flow of glue downwardly therebetween.

The shaft is fixed in plate-adjusting position by threading the nut on the post into engagement with the shaft to urge the shaft against the plate 18 and latch the plate to the bottom of the pot.

Should adjustment of the slot be required while the applicator is being operated, the knurled handle is accessible for this purpose, the plate may be released by moving the nut, and the shaft rotated to reposition the plates.

What we claim and desire to secure by Letters Patent is:

1. In a glue applicator including a pot having a slotted bottom, and a glue roller operable in the slot, means including a post in the pot, and a tubular shaft rotatable on the post having an operating handle exterior to the pot for varying the effective area of the slot.

2. In a device of the character described including a pot having a horizontal slotted bottom, means including a plate slidable on said bottom and a vertical shaft engaged with said plate and having an operating handle projecting above the upper edge of the pot for varying the effective area of the slot.

3. In a glue applicator including a pot having a bottom provided with a slot, and a glue roller operable in the slot, means including a plate slidable on the bottom in engagement with the sides of said roller and having a flange extending across the slot and a shaft adapted to move said plate in opposite directions for varying the effective length of the slot, said shaft extending upwardly through said pot and projecting beyond the upper edge thereof.

4. In a glue applicator including a pot having a bottom provided with a slot, and a glue roller operable in the slot, means insluding a plate slidable on the bottom and a rotatable shaft projecting beyond the upper edge of said pot and engaged at its lower end with the plate to move the same in opposite directions for varying the effective length of the slot.

5. In a device of the character described including a pot having a bottom provided with a slot, a plate slidable on the bottom and having a flange extending across the slot and means extending into said pot and having a handle above the upper edge of the pot for moving the plate in opposite directions to vary the effective length of the slot.

6. In a glue applicator including a pot having a bottom provided with a slot, and a glue roller extending in the slot with its periphery in spaced relation with the front end of the slot to provide a glue outlet opening, a pair of interlocking plates slidable over the bottom and having portions engaging the sides of the roller, and adapted to adjust the effective area of said outlet, means having an operating handle exterior to the pot for moving one of said plates to effect adjustment of said pair of plates, and means for fixing the plate-moving means in outlet-adjusting position.

7. In a glue applicator including a pot having a bottom provided with a slot, and a glue roller extending in the slot with its periphery in spaced relation with the front end of the slot to provide a glue outlet opening, a pair of interlocking plates slidable over the bottom, and adapted to adjust the effective area of said outlet, a shaft having an operating handle exterior to the pot and a lug engaged with one of said plates for moving the pair of plates, and means including said shaft for fixing the plates in outlet-adjusting position.

8. In a device of the character described including a pot having a bottom slot, means for varying the effective area of the slot including an adjustable plate, a post engaged with the pot, a rotatable shaft engaged with the plate for adjusting the same, and means movable on said post for fixing the shaft against rotation to retain the plate in adjusted position.

9. In a device of the character described including a pot having a bottom provided with a slot, means for varying the effective area of the slot including adjustable spaced plates, means for restricting the plates to rectilinear movement, a rotatable shaft engaged with the plates for moving the same, and means including said shaft for clamping the plates to said bottom to retain the plates in adjusted position.

10. In a glue applicator including a pot having a bottom slot, and a glue roller operating in said slot, means for varying the effective area of the slot including adjustable plates having front portions engaged with the sides of the roller and rear portions spaced from the sides of the roller, a rotatable shaft engaged with one of the plates for adjusting the same, and means including said shaft for retaining the plates in adjusted position.

11. In a glue applicator including a pot having a bottom slot, and a glue roller operating in said slot, means for varying the effective length of the slot including an adjustable plate, a post rigidly fixed to the pot, a tubular shaft rotatable on the post and adapted to adjust the plate, and means for locking the shaft to the post.

12. In a glue applicator including a pot having a bottom slot, and a glue roller operating in said slot, means for varying the effective length of the slot including an adjustable plate having an elongated opening and a notch in the side of the opening, a post rigidly fixed to the pot in said opening, a tubular shaft rotatable on the post and having a lug engaged with said notch for adjusting the plate, and means on the post for locking the shaft to fix the plate in adjusted position.

In testimony whereof we affix our signatures.

WILLIAM H. KUSHERA.
FRED M. BRACKETT.